Patented Sept. 4, 1934

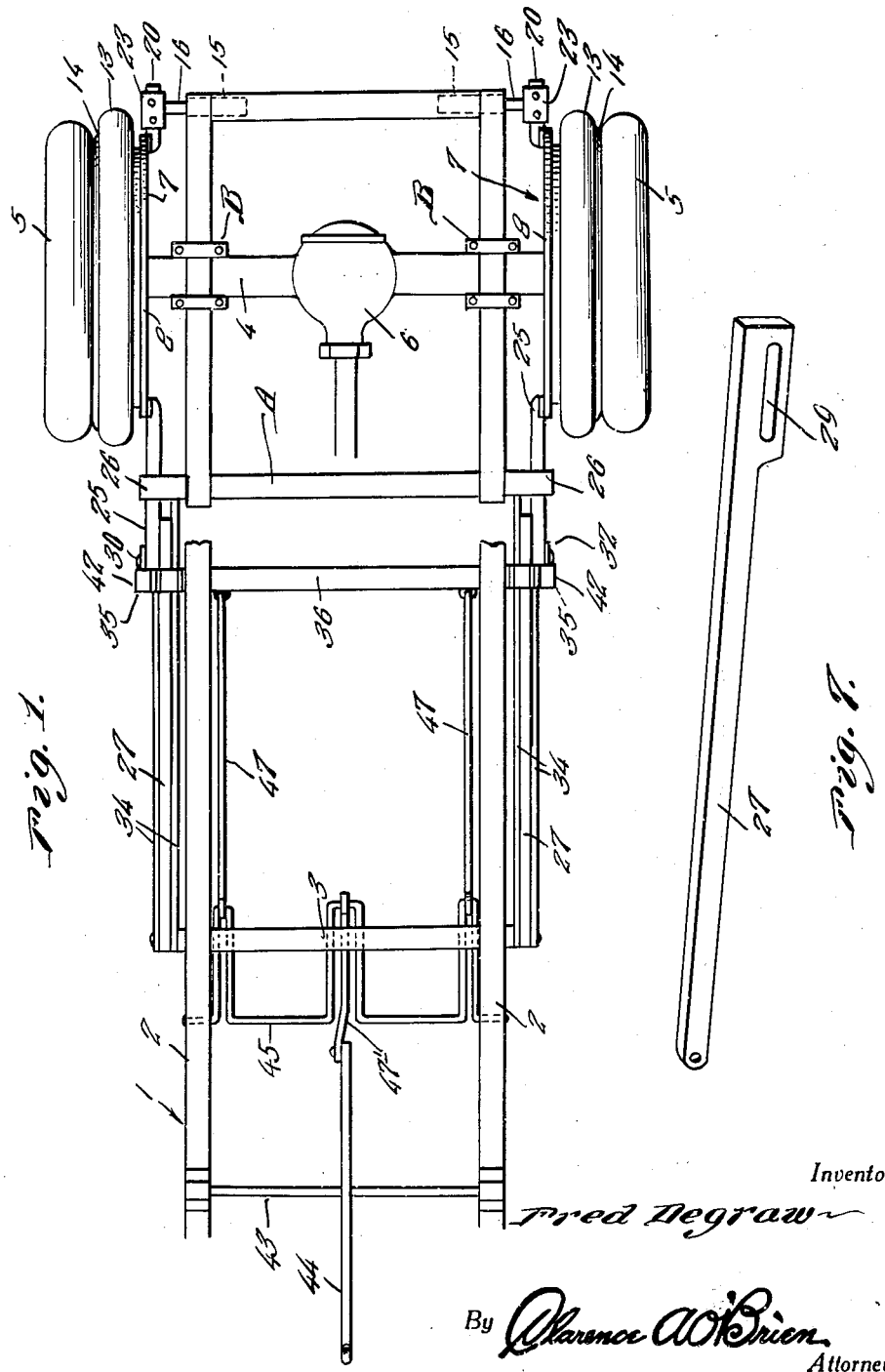

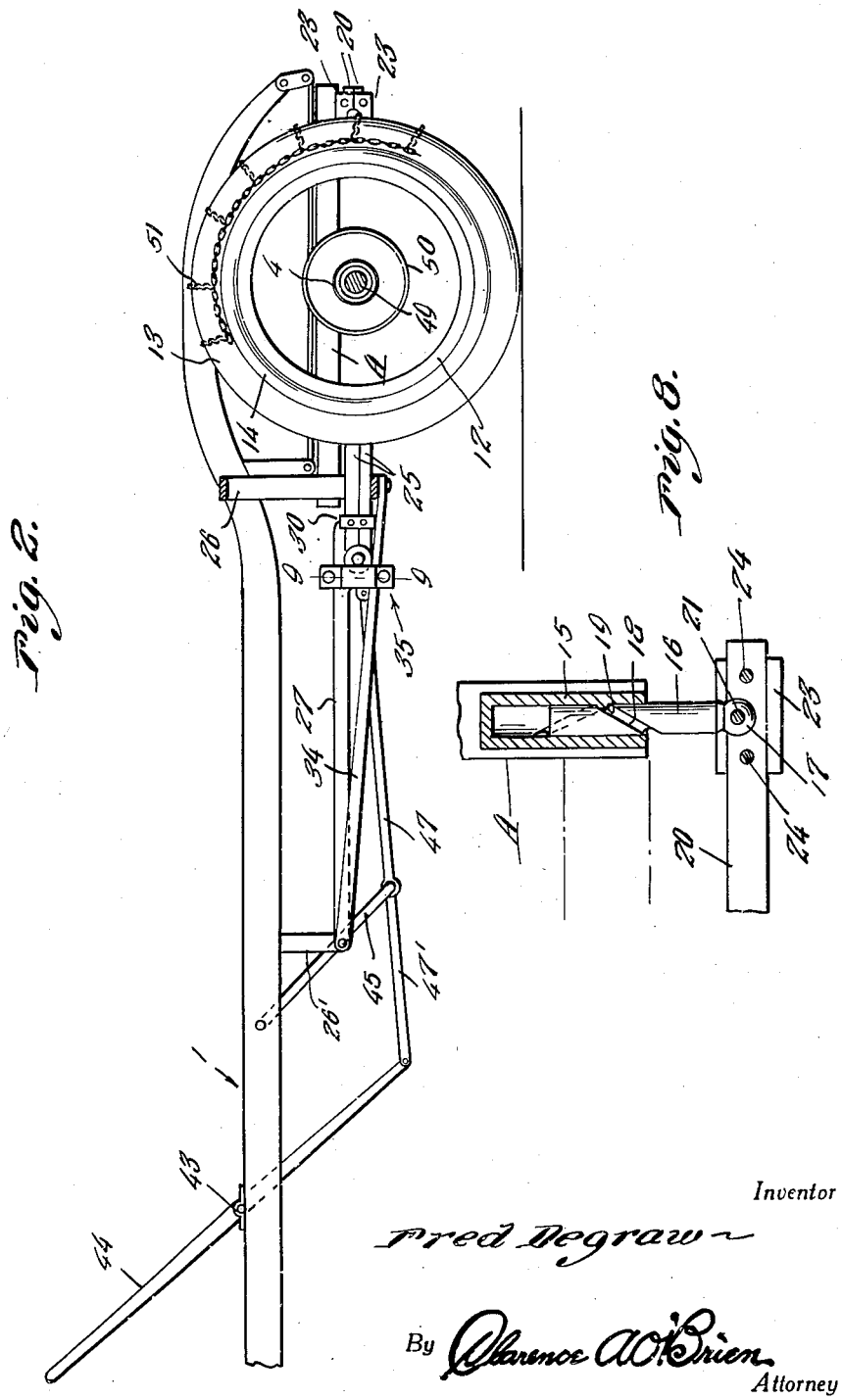

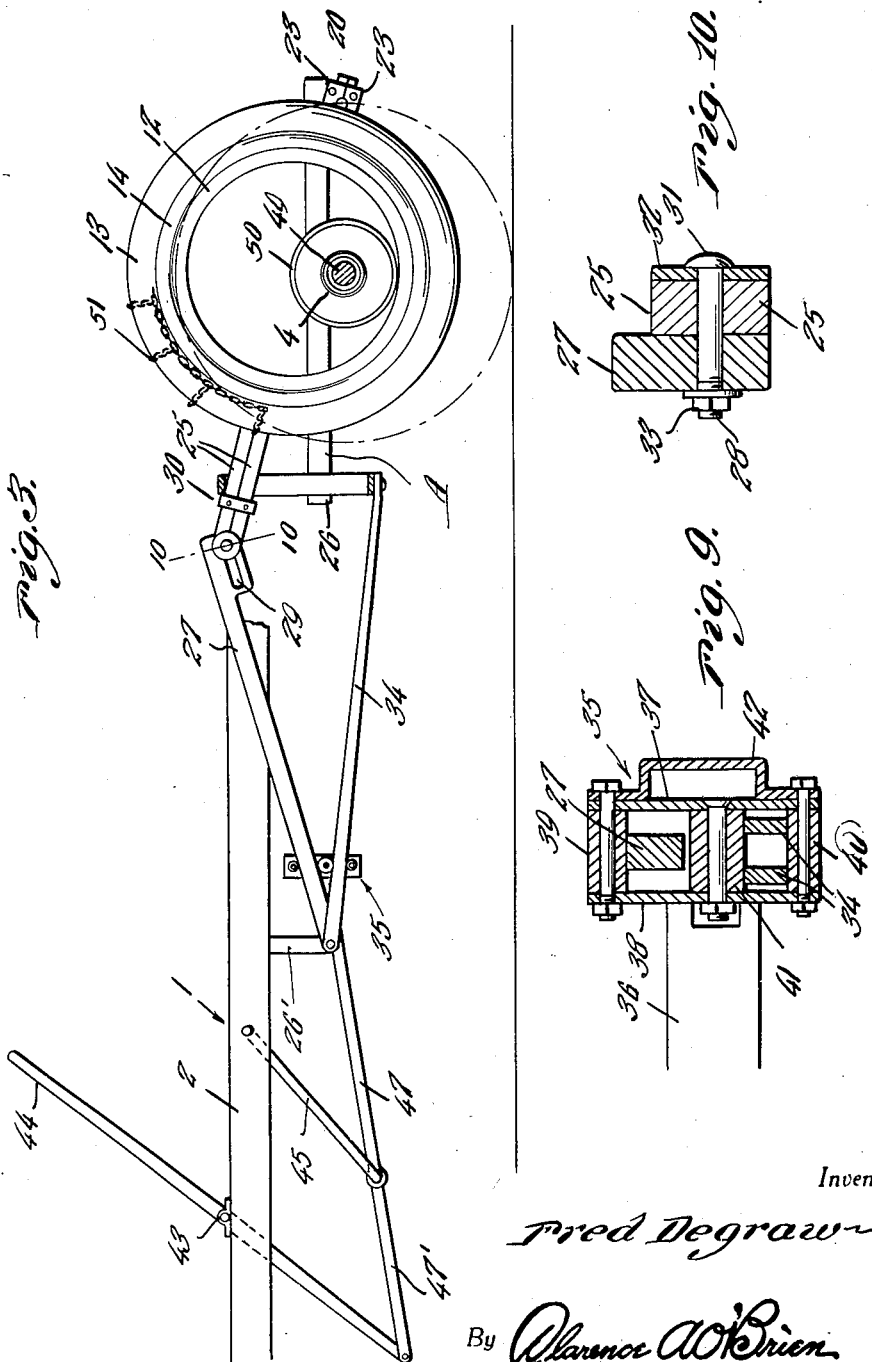

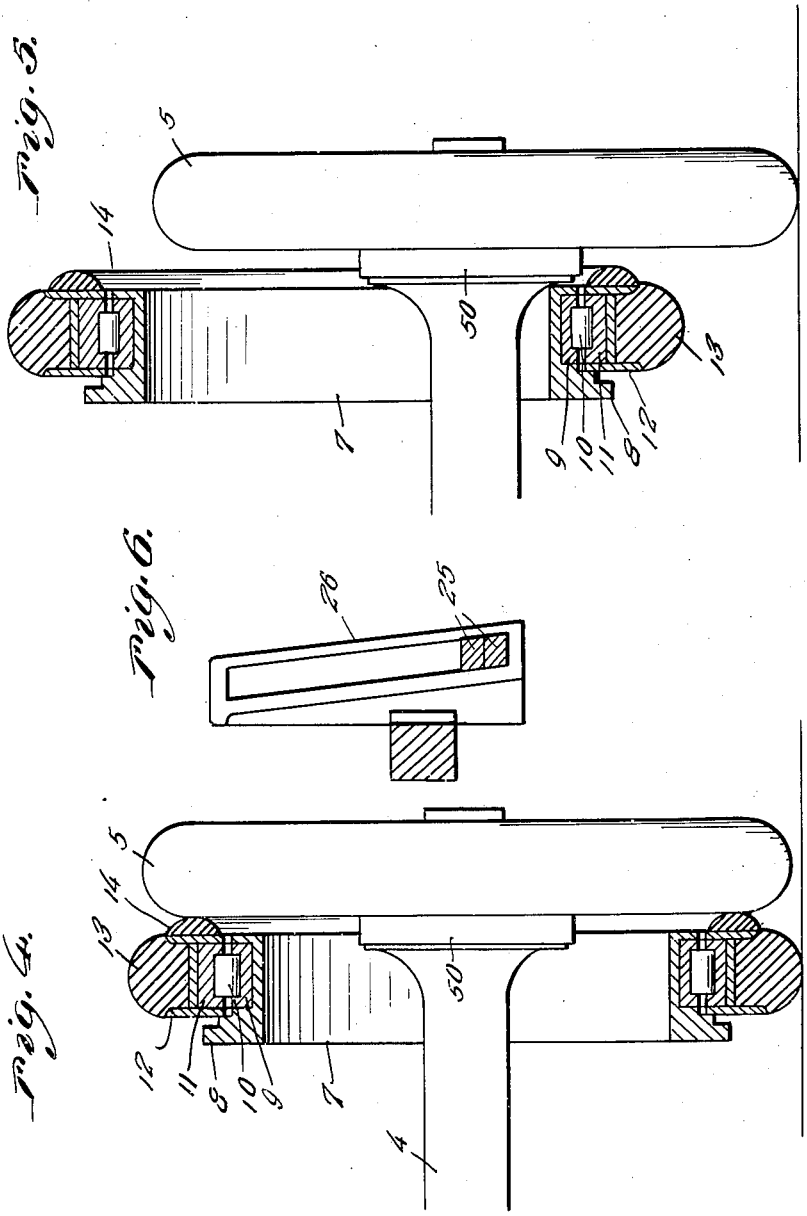

1,972,839

UNITED STATES PATENT OFFICE 1,972,839

AUXILIARY DRIVE WHEEL FOR AUTOMOBILES

Fred De Graw, Morristown, N. J.

Application April 6, 1931, Serial No. 528,167

8 Claims. (Cl. 180—15)

The present invention relates generally to automotive vehicles, and has for its primary object to provide, in a manner as hereinafter set forth, an automobile which is equipped with a pair of auxiliary drive wheels for increasing traction, preventing skidding on slippery streets or roads and to permit continuation of travel after one of the pneumatic tires has been deflated due to puncture or other causes, without damage to the deflated tire, thereby eliminating the necessity of stopping to apply anti-skid chains or to replace or repair a tire which has become deflated.

Another very important object of the invention is to provide a pair of auxiliary wheels for automobiles which are mounted permanently ready for use at any time, the invention further including novel means for shiftably supporting the auxiliary wheels in a manner to permit the same to be expeditiously moved from inoperative to operative position and vice versa, the invention still further contemplating manually operable means for shifting the auxiliary wheels.

Other objects of the invention are to provide auxiliary drive wheels for automobiles of the character described which will be simple in construction, strong, durable, efficient and reliable in use and which may be manufactured and installed at low cost on conventional automobiles without the necessity of materially altering said automobiles structurally.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in top plan showing a pair of auxiliary wheels constructed in accordance with the present invention mounted in operative position with respect to the rear wheels of an automobile, the rear portion of the running gear only of said automobile being shown.

Figure 2 is a view showing the invention principally in side elevation and partially in vertical section, one of the conventional rear wheels of the automobile being removed and the axle of said automobile being shown in cross section, the auxiliary wheels being in operative position.

Figure 3 is a view similar to Figure 2 showing the position of the auxiliary wheels when inoperative.

Figure 4 is a view in vertical cross section through one of the auxiliary wheels showing the same in operative position.

Figure 5 is a view similar to Figure 4 showing one of the auxiliary wheels in inoperative position.

Figure 6 is a detail view in cross section through one of the pairs of wheel supporting arms showing the cam member for shifting the wheel toward or away from the conventional automobile wheel.

Figure 7 is a detail view in perspective of one of the operating levers.

Figure 8 is a detail view in horizontal cross section showing the rear supporting means for the auxiliary wheels.

Figure 9 is a sectional view taken substantially on the line 9—9 of Figure 2.

Figure 10 is a vertical cross sectional view taken substantially on the line 10—10 of Figure 3.

Referring to the drawings in detail, it will be seen that the frame of the automobile is designated generally by the reference numeral 1 and comprises the usual longitudinal side members 2 between which stand the cross members 3, said cross members 3 being spaced from each other. The reference numeral 4 designates the rear axle housing and the numeral 5 the pneumatic tire equipped rear wheels of the automobile. The numeral 6 designates the differential housing of the automobile.

Disposed inwardly of each of the rear wheels 5 is a peripherally channelled annulus 7 having a stepped, radial flange 8, formed integrally therewith on its inner marginal portion. Mounted in the peripheral channel of the annulus 7 is a race 9 in which the cylindrical rollers 10 travel. The anti-friction rollers 10 travel between the race 9 and an outer race 11 which is mounted in the tire rim 12 which carries a cushion tire 13. It will thus be seen that the tire 13 and the rim 12 together with the outer race 11 are mounted for rotation on the annular annulus 7. Fixed in any suitable manner on the outer side of each of the rims 12 is a resilient ring 14 of segmental cross section which is adapted for frictional engagement with the inner wall of the adjacent pneumatic tire of the automobile wheel in a manner to operatively connect the rim 12 thereto for actuation thereby when the auxiliary wheels constituting this invention are in operative position. The rings 14 may be of any suitable material, preferably rubber.

The reference character A designates a frame including transverse and longitudinal members, said frame A being rigidly secured in any suitable manner, as at B, on the rear axle housing 4.

Mounted in any suitable manner on the rear end portion of the frame A and adjacent the sides of said frame is a pair of cylinders 15 which are closed at their inner ends and open at their outer ends, as illustrated to advantage in Figure 8 of the drawings. Mounted for both rotation and reciprocation simultaneously in each of the cylinders 15 is a short shaft 16 having a head 17 on its outer end provided with a vertical aperture. Each shaft 16 is provided with a spiral groove 18 which receives the spiral thread 19 on the interior of each cylinder 15. Thus, when the shafts 16 are rotated in the cylinders 15, said shafts will also be caused to move longitudinally in said cylinders.

Superposed arm 20 are mounted on the inner sides of the annuli 7 and project rearwardly therefrom. The pairs of arms 20 embrace the heads 17 of the shafts 16 and are secured thereto for swinging movement in a substantially horizontal plane through the medium of the pivot pins 21 which extend through the vertical apertures in the heads 17 and are anchored in the upper and lower arms 20 constituting the pairs of said arms. Each pair of the arms 20 is clamped to the head 17 of the adjacent shaft 16 through the medium of channeled clamping plates 23 and the bolts 24. It will thus be seen that the arms 20 may swing laterally on the shafts 16 without imparting any movement to said shafts 16 but any swinging movement of the arms 20 in a vertical plane will cause rotation of the shafts 16 and thus feed said shafts 16 longitudinally relative to the cylinders 15.

Pairs of arms 25 are rigidly secured in any suitable manner to the inner side of each of the annuli 7 and project forwardly therefrom and are operable in the cam brackets 26 which are provided therefor and which are secured in any suitable manner to the sides of the forward portion of the frame A. Brackets 26' depend from the automobile frame 1 on the sides thereof and have pivotally connected to their lower ends the forward ends of the links 27 having enlarged, longitudinally slotted rear end portions which are operatively connected to each pair of the arms 25 by bolts 28 which are operable in the slots 29 of said enlarged rear end portions of the links 27. Clamps 30 secure the forward end portions of the pairs of arms 25 together. Each of the bolts 28 is provided with a head 31 which is engaged with a circular plate 32 which, in turn, is engaged with the outer sides of the arms 25. Retaining nuts 33 are also provided on the bolts 28, as clearly seen in Figure 10 of the drawings.

Pairs of track bars 34 extend between the lower ends of the cam brackets 26 and the depending brackets 26', as best seen in Figure 9 of the drawings.

Link operating units designated generally by the reference numeral 35 are operable longitudinally on the track bars 34 and are operatively engaged with the links 27 in the manner illustrated to advantage in Figure 9 of the drawings. The link operating units 35 are fixed on the ends of a transverse bar 36 which is disposed beneath the frame 1 of the automobile. The units 35 include metallic side plates 37 and 38 between which are journaled the upper and lower rollers 39 and 40, respectively, and intermediate rollers 41. The rollers 39 and 41, inclusive, are adapted for rolling contact with the track bars 34 and the links 27. A plate 42 having an offset intermediate portion is mounted on each of the outer side plates 37 for engagement over the forward end portions of the pairs of arms 25 in a manner to positively retain said arms 25 against upward swinging movement when the auxiliary wheels are in operative position, as clearly seen in Figure 2 of the drawings. When the auxiliary wheels are in operative position the enlarged rear end portions of the links 27 rest on the rear end portions of the track bars 34 and said links are substantially in longitudinal alignment with the pairs of arms 25.

A rock shaft 43 extends transversely between the side members 2 of the automobile frame 1 forwardly of the depending brackets 26' and said rock shaft 43 is connected with an intermediate portion of a lever 44 which is operable through the floor board (not shown) of the automobile. A crank shaft 45 is journaled between the side members 2 of the automobile frame 1 and is operatively connected to the bar 36 by the rods 47. The crank shaft 45 is connected to the lower end portion of the lever 44 for actuation thereby through the medium of a coupling rod 47'.

When in inoperative position, the auxiliary wheels are disposed as shown in Figure 5 of the drawings. When it is desired to shift the auxiliary wheels from inoperative to operative position as shown in Figure 4 of the drawings, the upper end of the lever 44 is swung forwardly and the bar 36 is moved rearwardly through the medium of the rods 47, the crank shaft 45 and the rod 47' connected to the lower end portion of said lever. The bar 36 moves the units 35 which are mounted on its ends rearwardly on the track bars 34 with the result that the links 27 are swung downwardly as are also the arms 25 which project from the annular carriages. This downward swinging movement rotates the shafts 16 in their cylinders 15 in a manner to feed said shafts outwardly. As the arms 25 move downwardly, said arms are also caused to move outwardly by the cam brackets 26 and thus, when the auxiliary wheels have been moved downwardly to a position which is co-axial with the conventional wheels of the automobile, said auxiliary wheels will have been shifted outwardly in a manner to frictionally engage the rings 14 with the pneumatic tires of the automobile wheels. The cam brackets 26 and the spirally threaded shafts 16, in conjunction with their cylinders 15, provide means for tightly engaging the rings 14 with the pneumatic tires to provide a friction drive between said tires and the auxiliary wheels.

When it is desired to shift the auxiliary wheels from operative to inoperative position, the lever 44 is swung rearwardly to move the units 35 forwardly thereby swinging the links 27 upwardly and reversing the aforementioned movement of the remaining elements.

In Figures 2 and 3 of the drawings, the axle of the automobile is designated by the reference numeral 49. Each of the conventional wheels 5 of the automobile is provided with a usual brake drum 50. Conventional anti-skid chains 51 are mounted at all times on the cushion tires 13 of the auxiliary wheels.

It is believed that the many advantages of a device constructed in accordance with this invention will be readily understood, and although the preferred embodiment of the invention is as illustrated and described, it is to be understood, of course, that changes in the details of construction and arrangement may be had which will fall within the scope of the invention as claimed.

What is claimed is:—

1. The combination with a vehicle having a pair of drive wheels, of a pair of auxiliary wheels shiftably mounted on the vehicle between the drive wheels, said auxiliary wheels each comprising an annular carriage, a rim mounted for rotation on the annular carriage, a tire on the rim, and a ring mounted on each rim and engageable with its companion drive wheel so as to frictionally connect each auxiliary wheel to its companion drive wheel for actuation thereby when in operative position.

2. The combination with a vehicle having a pair of drive wheels, of a pair of auxiliary wheels shiftably mounted on the vehicle between the drive wheels, each of said auxiliary wheels comprising an annular carriage, a rim mounted for rotation on the annular carriage, a tire on the rim, and a ring mounted on each rim and engageable with the tire of the corresponding one of the wheels so as to frictionally connect each of the auxiliary wheels to its companion drive wheel for actuation thereby when in operative position, means shiftably connecting the annular carriages to the vehicle, and manually operable means for shifting the auxiliary wheels to operative and inoperative positions.

3. The combination with a vehicle having a pair of drive wheels, of a pair of auxiliary wheels frictionally engageable with the drive wheels for actuation thereby when in operative position, said auxilary wheels being disposed between the drive wheels, means shiftably mounting the auxiliary wheels on the vehicle for simultaneous lateral and vertical movement, each of the auxiliary wheels comprising an annular carriage, a rim mounted for rotation on the carriage and shiftable with said carriage, a tire on the rim, and a resilient ring fixed on one side of the rim and engageable with the companion one of the drive wheels thereby operatively connecting the rim thereto for actuation thereby.

4. The combination with a vehicle having a pair of drive wheels, of a pair of auxiliary wheels frictionally engageable with the drive wheels for actuation thereby when in operative position, said auxiliary wheels being disposed between the drive wheels, means shiftably mounting the auxiliary wheels on the vehicle for simultaneous lateral and vertical movement, each of the auxiliary wheels comprising an annular carriage, a rim mounted for rotation on the carriage and shiftable with said carriage, a tire on the rim, and a resilient ring fixed on one side of the ring and engageable with the companion one of the drive wheels thereby operatively connecting the rim thereto for actuation thereby, and manually operable means connected with the auxiliary wheels for shifting said auxiliary wheels to operative and inoperative positions.

5. The combination with a vehicle chassis having a ground engaging wheel carried by an axle, of an auxiliary wheel encircling the axle, mounting means for mounting the auxiliary wheel on the vehicle, said mounting means being operable to cause said auxiliary wheel to move from an elevated position out of engagement with the vehicle wheel to a depressed position in frictional engagement with the ground engaging wheel and engaged with the ground means on the auxiliary wheel causing frictional engagement thereof with the ground engaging wheel so as to be driven by the ground engaging wheel and inclined guide means on the chassis with which a portion of the mounting means is engaged for imparting angular motion to the mounting means when it is operated.

6. The combination with a vehicle chassis having a ground engaging wheel, of an auxiliary wheel, an auxiliary wheel carrying member permitting rotation of the auxiliary wheel, laterally movable means connecting one side of said wheel carrying member with the chassis, vertically and laterally movable means connecting another side of said wheel carrying member to the chassis, third means operatively connected with the second mentioned means for operating the said member in a lateral and downward direction to carry said auxiliary wheel into concentric engagement with a side of the ground engaging wheel, and means on said auxiliary wheel causing frictional engagement thereof, with the side of the ground engaging wheel.

7. The combination with a vehicle chassis having an axle carrying a ground engaging wheel, of an auxiliary wheel, an auxiliary wheel carrying member rotatably mounting said auxiliary wheel, a pivotal and sliding connection connecting one side of said member to the chassis and permitting laterally outward movement of the said side of the member accompanied by pivoting on a horizontal axis, a second connection connecting the opposite side of said member to the chassis, said second connection including a downwardly and laterally outwardly declining guide and an element fastened to said member and vertically slidably confined in said guide, manual means on said chassis for vertically swinging said element to move said auxiliary wheel in a lateral downward direction from an elevated position toward and into concentric engagement with one side of said ground engaging wheel, and means on said auxiliary wheel for frictionally contacting the said side of the ground engaging wheel whereby the wheels are connected for rotation.

8. The combination with a vehicle chassis having an axial carrying a ground engaging wheel, of an auxiliary wheel, an auxiliary wheel carrying member rotatably mounting said auxiliary wheel, a pivotal and sliding connection connecting one side of said member to the chassis and permitting laterally outward movement of the said side of the member accompanied by pivoting on a horizontal axis, a second connection connecting the opposite side of said member to the chassis, said second connection including a downwardly and laterally outwardly declining guide and an element fastened to said member and vertically slidably confined in said guide, manual means on said chassis for vertically swinging said element to move said auxiliary wheel in a lateral downward direction from an elevated position toward and into concentric engagement with one side of said ground engaging wheel, and means on said auxiliary wheel for frictionally contacting the said side of the ground engaging wheel whereby the wheels are connected for rotation, said pivotal and sliding connection comprising a socket on said chassis having a worm thread, and a horizontal rod rotatably received in said socket and having a worm groove cooperating with said worm thread, the outer end of said horizontal rod being pivoted on a vertical axis to the said one side of the wheel carrying member.

FRED DE GRAW.